(12) United States Patent
Stewart

(10) Patent No.: US 10,489,105 B2
(45) Date of Patent: Nov. 26, 2019

(54) QUIET-ALL INPUT FOR TWO OR MORE AUDIO SOURCES IN A VEHICLE

(71) Applicant: Toyota Motor Engineering & Manufacturing North America, Inc., Erlanger, KY (US)

(72) Inventor: Andrew F. Stewart, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/475,884

(22) Filed: Mar. 31, 2017

(65) Prior Publication Data

US 2018/0285058 A1   Oct. 4, 2018

(51) Int. Cl.
*H04B 1/08* (2006.01)
*G06F 3/16* (2006.01)
*H04R 3/12* (2006.01)

(52) U.S. Cl.
CPC .............. *G06F 3/165* (2013.01); *H04R 3/12* (2013.01); *H04R 2430/01* (2013.01); *H04R 2499/13* (2013.01)

(58) Field of Classification Search
CPC ...... G06F 3/165; G06F 3/0481; G06F 3/0488; H04R 3/12; H04R 2499/13; H04R 2430/01; H04R 2420/01; H03G 3/20; H03G 9/18; H03G 7/00; H04S 2400/13
USPC ........ 381/302, 56–59, 71.4, 86, 80–81, 102, 381/104–109, 120, 123
See application file for complete search history.

(56) References Cited

U.S. PATENT DOCUMENTS

| | | |
|---|---|---|
| 5,208,865 A | 5/1993 | Friske et al. |
| 7,911,983 B2 | 3/2011 | Patel et al. |
| 8,190,438 B1 * | 5/2012 | Nelissen .......... G10L 21/00 381/85 |
| 8,275,307 B2 | 9/2012 | Doyle, III |
| 9,302,622 B2 | 4/2016 | Hwang |
| 2002/0151997 A1 | 10/2002 | Wilcock et al. |
| 2007/0150906 A1 * | 6/2007 | Richards .......... G06F 9/541 719/328 |
| 2008/0032663 A1 * | 2/2008 | Doyle .......... H04H 20/106 455/345 |
| 2008/0273713 A1 * | 11/2008 | Hartung .......... H04R 5/02 381/86 |
| 2008/0319564 A1 | 12/2008 | Furge et al. |
| 2009/0110211 A1 * | 4/2009 | Feit .......... H04R 5/02 381/86 |

(Continued)

*Primary Examiner* — Norman Yu
(74) *Attorney, Agent, or Firm* — Christopher G. Darrow; Darrow Mustafa PC

(57) ABSTRACT

Arrangements described herein can control audio within a vehicle by stopping sound from two or more audio sources based on one quiet-all input. Systems can output sound via one or more speakers in response to audio signals from two or more audio sources. A quiet-all input can be received via a user interface, where the quiet-all input is a single input to stop sound from the two or more audio sources. Responsive to receiving the quiet-all input, all sound output through the one or more speakers from the two or more audio sources can be stopped or reduced to a predetermined volume.

19 Claims, 3 Drawing Sheets

(56) References Cited

U.S. PATENT DOCUMENTS

2015/0232065 A1* 8/2015 Ricci ................... B60R 25/01
                                                    701/36
2015/0258992 A1* 9/2015 Sawamoto ............ B60W 30/17
                                                    701/1

* cited by examiner

QUIET-ALL INPUT FOR TWO OR MORE AUDIO SOURCES IN A VEHICLE

FIELD

The subject matter described herein relates in general to in-vehicle audio and, more particularly, to in-vehicle audio control for two or more audio sources.

BACKGROUND

Modern vehicles can include speakers to produce sounds from a variety of audio sources. The audio sources can include entertainment systems, safety systems, communication systems, and navigation systems. In certain situations, occupants of a vehicle may wish for quiet within the vehicle. For example, occupants may be sleeping or communicating with someone. It can be cumbersome, distracting, and time intensive for a user to quiet, or mute, multiple audio sources individually. Further, quieting multiple audio sources individually can present safety concerns, as doing so might take attention away from operating the vehicle.

SUMMARY

In one respect, the present disclosure is directed to a method for controlling audio within a vehicle. The method includes outputting sound via one or more speakers in response to audio signals from two or more audio sources. The method further includes receiving a quiet-all input via a user interface. The quiet-all input is a single input to quiet all sound from the two or more audio sources. Responsive to receiving the quiet-all input, the method includes quieting all sound output via the one or more speakers from the two or more audio sources.

In another respect, the present disclosure is directed to an audio control system for a vehicle. The system can include two or more audio sources, a speaker located within the vehicle, and a user interface having a quiet-all input. The quiet-all input is a single input to quiet all sound from the two or more audio sources. The system further includes a processor communicatively linked to the two or more audio sources, the speaker, and the user interface. The processor is programmed to initiate executable operations including outputting sound via one or more speakers in response to audio signals from two or more audio sources and responsive to receiving the quiet-all input via the user interface, quieting all sound output via the speaker from the two or more audio sources. Quieting all sound output includes stopping all sound out or reducing a volume of sound output to a predetermined threshold In yet another respect, the present disclosure is directed to a method for controlling audio within a vehicle. The method includes outputting sound via one or more speakers in response to audio signals from an entertainment system and a navigation system. The method further includes receiving a quiet-all input via a user interface, whereby the quiet-all input is a single input to stop all sound. Responsive to receiving the quiet-all input, the method includes stopping all sound output via the one or more speakers.

DETAILED DESCRIPTION

Arrangements described herein can control audio within a vehicle by quieting sound from two or more audio sources based on one quiet-all input in an intuitive manner. Sound can be outputted via one or more speakers within a vehicle based on audio signals from two or more audio sources. The audio sources can include, for example, entertainment systems, safety systems, communication systems, and/or navigation systems. A quiet-all input can be received via a user interface, where the quiet-all input is a single input to quiet sound from the two or more audio sources. Responsive to receiving the quiet-all input, all sound output through the one or more speakers from the two or more audio sources can be reduced and/or stopped. The present detailed description relates to systems and methods that incorporate one or more of such features. In at least some instances, such systems and methods can allow for a quick, safe, and easy way to quiet sounds from multiple audio sources.

Figure 2:
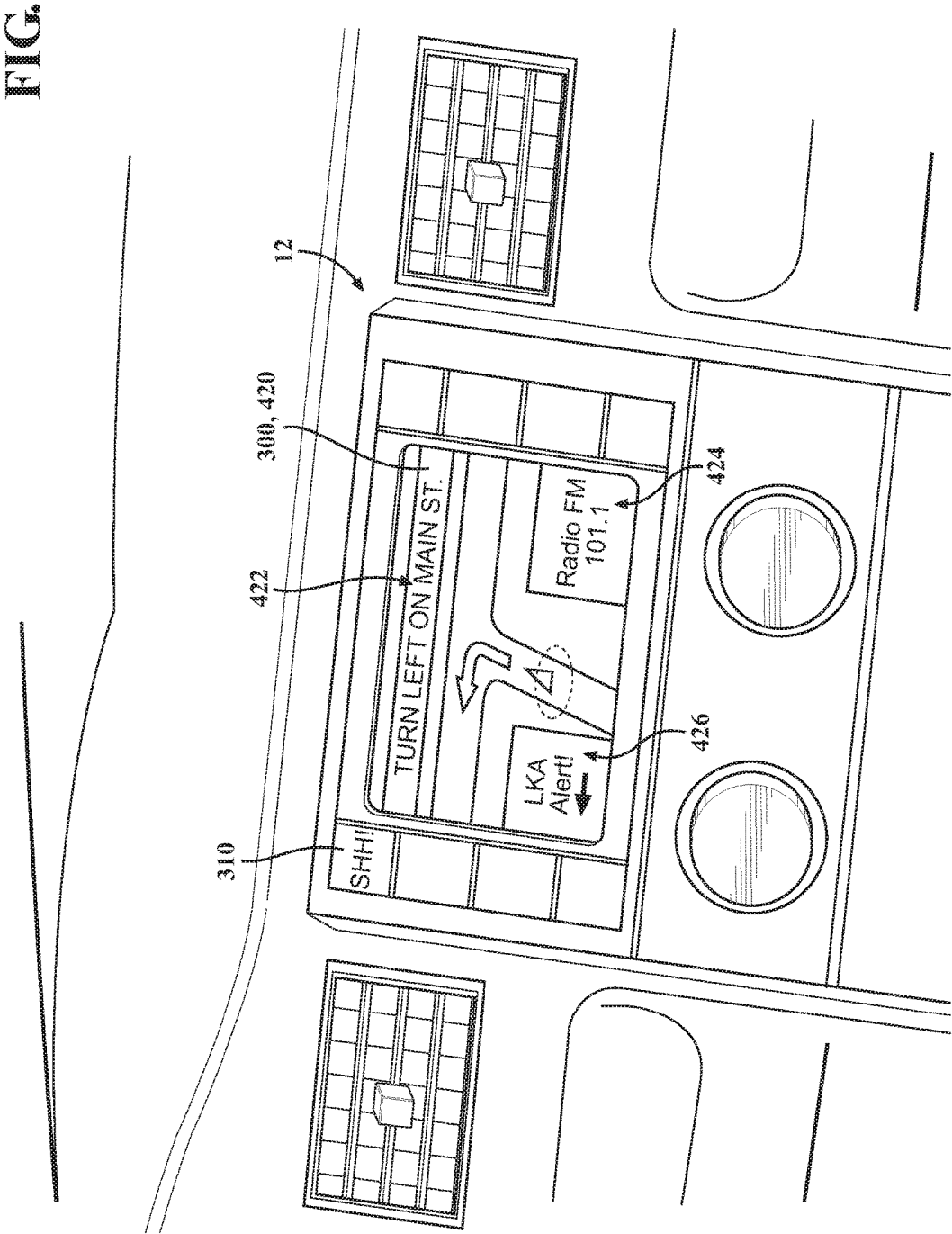
FIG. 2 is an example of a display in a vehicle for use with the audio control system of FIG. 1.
Figure 3:
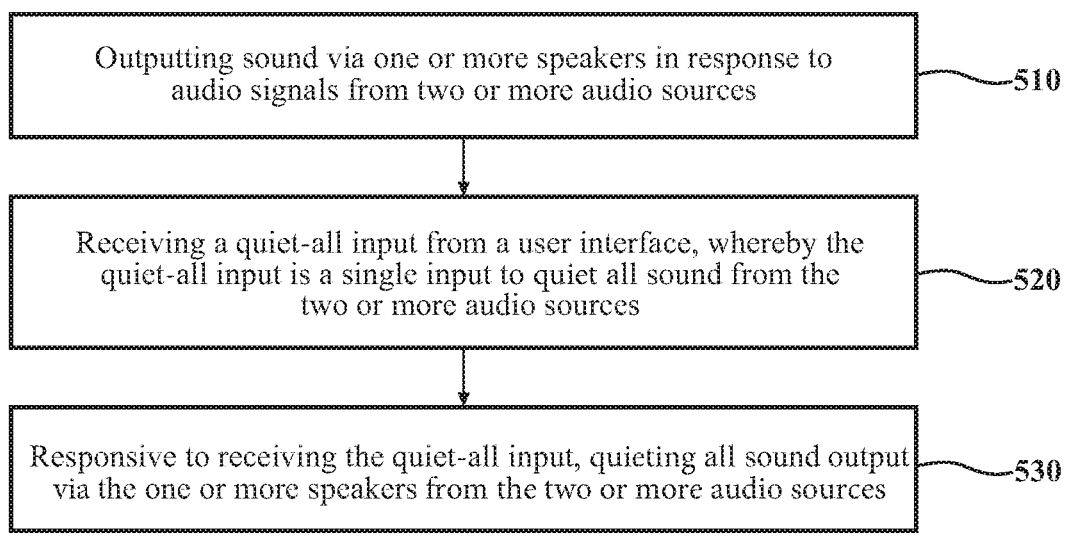
FIG. 3 is an example of a method of controlling audio within a vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
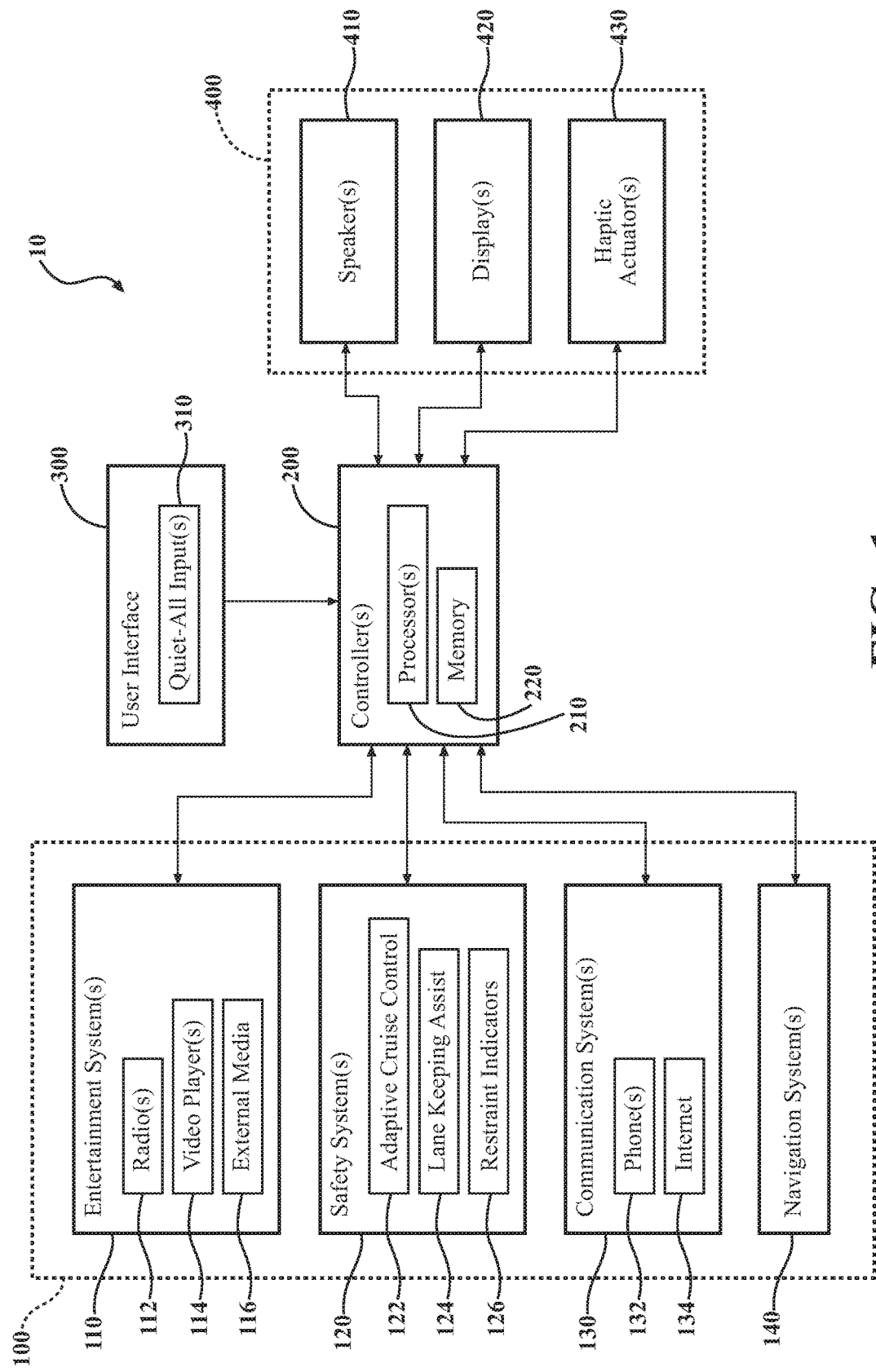
FIG. 1 is an example of an audio control system.

Referring to FIG. 1, an example audio control system 10 (also referred to as "system 10") is shown. In one or more arrangements, the system 10 can be configured for use with a vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport.

The system 10 can include various elements. Some of the possible elements of the system 10 are shown in FIG. 1 and will now be described. It will be understood that it is not necessary for the system 10 to have all of the elements shown in FIG. 1 or described herein. The system 10 can have any combination of the various elements shown in FIG. 1. Further, the system 10 can have additional elements to those shown in FIG. 1. In some arrangements, the system 10 may not include one or more of the elements shown in FIG. 1. Further, while the various elements are shown as being located within the system 10 in FIG. 1, it will be understood that one or more of these elements can be located external to the system 10. Further, the elements shown may be physically separated by large distances.

The various elements can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the system 10 can include and/or execute suitable communication software, which enables the various elements to communicate with each other through the communication network and perform the functions disclosed herein.

The one or more communication networks can be implemented as, or include, without limitation, a wire harness, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and or satellite-based wireless network, GSM, TDMA, CDMA, WCDMA networks or the like). The communication network can include wired communication links and/or wireless communication links. The communication network can include any combination of the above networks and/or other types of networks.

The system 10 can include one or more audio sources 100. As used herein, "audio sources" includes any device, component, system, element or arrangement or groups thereof that can generate an audio signal to produce sounds within a vehicle. "Audio signals" include any signals representative of sound that can be sent to one or more components of the system 10. The audio signals can allow for sounds to be produced by one or more speakers within a vehicle.

In one or more arrangements, the audio sources 100 can include one or more entertainment systems 110. In one or more arrangements, the entertainment system(s) 110 can include one or more radios 112. The radio(s) 112 can include any device, component, system, element or arrangement or groups thereof that can receive wireless signals and generate audio signals for playback by one or more speakers. For example, the radio(s) 112 can include an FM radio, an AM radio, a satellite radio, and/or an internet radio.

In one or more arrangements, the entertainment system(s) 110 can include one or more video players 114. The video player(s) 114 can include any device, component, system, element or arrangement or groups thereof that can generate both audio signals and video signals. For example, the video player(s) 114 can include media players (e.g., DVDs, CDs, BLU-RAY, VCR). Alternatively or in addition, the video player(s) 114 can receive audio and video signals wirelessly (e.g., streaming devices). The video player(s) 114 can be configured to display video on one or more in-vehicle displays.

In one or more arrangements, the entertainment system(s) 110 can include one or more external media players 116. The external media player(s) 116 can be any device, component, system, element or arrangement or groups thereof that are removable and/or separate from the vehicle, can generate audio signals, and are communicatively linked to the system 10. For example, the external media players can include user devices such as telephones (e.g., a cellular telephone, a smart phone), a computer (e.g., a laptop, a tablet, a phablet, an mp3 player), and/or any other portable computing device. For example, audio signals can be generated by a smartphone from media files saved on the device or received by the device (e.g. streaming applications).

In one or more arrangements, the audio sources 100 can include one or more safety systems 120. The safety systems 120 can include any device, component, system, element or arrangement or groups thereof that are configured to provide audio signals based on a condition of one or more safety systems of a vehicle.

In one or more arrangements, the safety system(s) 120 can include an adaptive cruise control (ACC) system 122. The ACC system 122 can be any vehicle system configured to automatically adjust a vehicle speed to maintain a safe distance from objects. In one or more arrangements, the ACC system 122 can be configured to generate alerts and/or notifications for a user. For example, the ACC system 122 can be configured to generate an alert when the vehicle is located within a predetermined distance from another vehicle on the road. The ACC system 122 can be configured to generate audio alerts, visual alerts, and/or haptic alerts.

In one or more arrangements, the safety system(s) 120 can include a lane keeping assist (LKA) system 124. The LKA system 124 can be any vehicle system configured to automatically adjust a vehicle's position within a lane of a roadway. In one or more arrangements, the LKA system 124 can be configured to generate alerts and/or notifications for a user. For example, the LKA system 124 can be configured to generate an alert when the vehicle is located within a predetermined distance from a lane marking and/or another vehicle on the road. The LKA system 124 can be configured to generate audio alerts, visual alerts, and/or haptic alerts.

In one or more arrangements, the safety system(s) 120 can include a restraint system 126. The restraint system 126 can be any vehicle system configured to restrain an occupant of the vehicle during operation. For example, the restraint system 126 can include seat belt restraints, airbags, doors, and/or windows. In one or more arrangements, the restraint system 126 can be configured to generate alerts and/or notifications for a user. For example, the restraint system 126 can be configured to generate an alert when a restraint does not meet desired conditions (e.g., seatbelt unbuckled, door ajar, airbag turned off). The restraint system 126 can be configured to generate audio alerts, visual alerts, and/or haptic alerts.

In one or more arrangements, the audio sources 100 can include one or more communication systems 130. The communication system(s) 130 can include any devices, elements, components, systems, applications and/or combinations thereof that allow communication between an occupant of the vehicle to an external source. In one or more arrangements, the communication system(s) 130 can include one or more phones 132. The phone(s) 132 can be incorporated within the vehicle. Alternatively or in addition, the phone(s) 132 can include user devices such as telephones (e.g., a cellular telephone, a smart phone). In some arrangements, the communication system(s) 130 can include internet devices 134 such as a computer (e.g., a laptop, a tablet, a phablet, an mp3 player), and/or any other portable computing device. The communication system(s) 130 can include applications that can translate text to sounds. For instance, the communication system(s) 130 can translate text messages and/or emails to speech played through the speaker(s) 410.

In one or more arrangements, the audio sources 100 can include one or more navigation systems 140. The navigation system 140 can include one or more mechanisms, devices, elements, components, systems, applications and/or combinations thereof, now known or later developed, configured to determine the geographic location of the vehicle and/or to determine a travel route for the vehicle. The navigation system 140 can include one or more mapping applications to determine a travel route for the vehicle. The navigation system 140 can include a global positioning system, a local positioning system or a geolocation system.

In one or more arrangements, the navigation system 140 can be configured to generate alerts and/or notifications for a user. For example, the navigation system 140 can be configured to generate an alert based on a location of the vehicle and/or travel directions. The navigation system 140 can be configured to generate audio alerts, visual alerts, and/or haptic alerts.

In one or more arrangements, the audio sources 100 can include one or more autonomous vehicle systems (not shown). The autonomous vehicle system(s) can include one or more mechanisms, devices, elements, components, systems, applications and/or combinations thereof, now known or later developed, configured to allow movement of the vehicle with reduced and/or no input from a human occupant.

In one or more arrangements, the autonomous vehicle system(s) can be configured to generate alerts and/or notifications for a user. For example, the autonomous vehicle system(s) can be configured to generate an alert based on an operation mode of the autonomous vehicle system, whether or not user input is required, and/or the status of the autonomous vehicle system(s). The autonomous vehicle system(s) can be configured to generate audio alerts, visual alerts, and/or haptic alerts.

The system 10 can include one or more controller(s) 200 to control one or more elements of the system 10. The controller(s) 200 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other. In one or more arrangements, the processor(s) 210 can be a main processor of the vehicle. For instance, the processor(s) 210 can be an electronic control unit (ECU).

The controller 200 can include memory 220 and/or one or more other data stores for storing one or more types of data. The memory 220 can include volatile and/or non-volatile memory. Examples of suitable memory 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 220 can be a component of the controller(s) 200, or the memory 220 can be operatively connected to the controller(s) 200 for use thereby. In one or more arrangements, the memory 220 can include instructions to allow the controller 200 to control one or more elements of the system 10.

The system 10 can include one or more user interfaces 300. In one or more arrangements, the user interface(s) 300 can include an input system. An "input system" includes any device, component, system, element, or arrangement or groups thereof that enable information/data to be entered into a machine. The user interface(s) 300 can receive an input from a vehicle occupant (e.g. a driver or a passenger). Any suitable input system can be used, including, for example, a keypad, display, touch screen, multi-touch screen, button, joystick, mouse, trackball, microphone, camera, and/or combinations thereof. The user interface(s) 300 can receive inputs in the form of a physical touch/input, a voice command, and/or a gesture.

In one or more arrangements, the user interface(s) 300 can include one or more quiet-all inputs 310. As described in further detail below, the quiet-all input(s) 310 can cause the system 10 to reduce and/or stop sounds from playing from two or more audio sources 100. The quiet-all input(s) 310 can be a component of the input system. For example, the quiet-all input(s) 310 can include a button, switch, voice command, touch screen selection, gesture control, and/or combinations thereof. The quiet-all input(s) 310 can be a single input to quiet all sound from two or more of the audio sources 100. As used herein, "quiet" includes reducing a volume of sounds and/or stopping all sounds from an audio source.

The system 10 can include output systems 400. "Output system" includes any device, component, system, element or arrangement or groups thereof that enable information/data to be presented to a user (e.g. a person, a vehicle occupant, etc.).

In one or more arrangements, the output systems 400 can include one or more speakers 410. "Speaker" means one or more elements, one or more devices, one or more components, one or more systems, and/or any combination thereof that produce sound in response to an audio signal input. Examples of speakers 410 include, for example, electroacoustic transducers, sound chips, and sound cards. In one or more arrangements, the speaker(s) 410 can produce sounds based on audio signals received from the audio sources 100 and/or the controller(s) 200.

In arrangements in which the output system 400 includes two or more speakers, the individual speakers can be configured to produce substantially the same sound as one another. Alternatively, the individual speakers can be configured to produce different sound from one another. For example, individual speakers can be configured to produce sounds from one channel of a multi-channel sound input (e.g., stereo, surround sound).

In one or more arrangements, the speakers 410 and/or the controller(s) 200 can be configured to produce two or more sound zones within a vehicle. "Sound zones" can include any configuration in which speakers 410 in different areas of the vehicle can produce different sounds. For example, a first sound zone of a vehicle can be around a first row of seats. A second sound zone of the vehicle can be around two or more rear seats (e.g., $2^{nd}$ row, $3^{rd}$ row). In some arrangements, different sound zones can produce sounds from different groups of audio sources. For example, a front row sound zone may include sounds from the radio 112, from the safety systems 120, and from the navigation systems 140. Rear seat sound zones may include sounds from the video player 114 and/or the external media player(s) 116.

In one or more arrangements, the output system 400 can include one or more displays 420. "Display" is defined as a component or a group of components that present information/data in a form that is perceptible to the human sense of sight. For instance, the display 180 can present video, images, graphics, etc. The display 420 can be any suitable type of display. For instance, the display 420 can be a liquid crystal display (LCD), a light emitting diode (LED) display or some other suitable display. In one or more arrangements, the display 420 can be a heads-up display, a display for a navigation system, and/or a display included in an instrument cluster. The display(s) 420 can be provided in any suitable location within a vehicle. In one or more arrangements, the display(s) 420 can be located in a front interior portion of the vehicle. As an example, the display(s) 420 can be included in a dashboard or instrument panel of a vehicle.

In one or more arrangements, the display 420 can include one or more light sources. The one or more light sources can generate or emit any type of light energy. In one or more arrangements, the one or more light sources can be electric-powered. In one or more arrangements, the one or more light sources can include one or more of the following types of electric-powered light sources: electron-stimulated, incandescent lamps, electroluminescent (EL) lamps, gas discharge lamps, high-intensity discharge lamps and/or lasers, just to name a few possibilities. In one or more arrangements, the one or more light sources can be light emitting diodes (LEDs). For instance, the one or more light sources can be organic LEDs, polymer LEDs, solid state lighting, LED lamps, and/or active-matrix organic LEDs. In some arrangements, the one or more light sources can be the same type of light source. In other arrangements, one or more of the one or more light sources can be a different type of light source than the other light sources.

In one or more arrangements, the output system 400 can include one or more haptic actuators 430. The haptic actuator(s) 430 can include any device, component, system, element or arrangement or groups thereof that is capable of presenting a haptic alert to a user. As used herein, a "haptic alert" is any communication that is perceptible to the human sense of touch. In one or more arrangements, the haptic actuator(s) 430 can include motors, pneumatic actuators, hydraulic pistons, relays, solenoids, and/or piezoelectric actuators, just to name a few possibilities. In one or more arrangements, the haptic actuator(s) 430 be configured to cause a vibration of a portion of an occupant seat, a steering wheel, and/or a pedal.

In one or more arrangements, elements of the audio sources 100, the controller(s) 200, the user interface(s) 300, and/or the output system(s) 400 can be provided as one unit. For example, the display(s) 420 can include a touch screen display that functions both as the user interface 300 and the display 420 of the output system(s) 400. In some arrangements, the entertainment system(s) 110, the communication system(s) 130, the navigation system(s) 140, the controller(s) 200, the user interface(s) 300, and/or the display(s) 420 can be integrated together. For example, these elements can be integrated within a vehicle head unit.

In one or more arrangements, the system 10 can control audio output through the speaker(s) 410. For example, the controller(s) 200 can cause one or more elements of the output systems 400 to convey information to a user. As used herein, "cause" or "causing" means to make, force, compel, direct, command, instruct, allow, and/or enable an action to occur. For instance, the controller(s) 200 can cause sounds to be generated via the speaker(s) 410 based on audio signals from the audio sources 100. In one or more arrangements, the controller(s) 200 can cause the display(s) 420 to display information and/or the haptic actuator(s) 430 to provide haptic alerts based on signals from the audio sources 100.

In one or more arrangements, the system 10 can quiet audio output through the speaker(s) 410. For example, the controller(s) 200 can stop one or more elements of the output systems 400 from conveying information to a user. In some arrangements, the controller(s) 200 can stop sound output through the speaker(s) 410 based on the audio source 100. A user can, through the user interface 300, select which audio source 100 to stop. As an example, if sound from the radio 112 and the navigation system 140 is being played, the user can selectively mute one system.

In one or more arrangements, the quiet-all input(s) 310 can allow the system 10 to quiet sound output through the speaker(s) 410 from multiple audio sources 100. The quiet-all input can be a single input to stop all sound from two or more audio sources. Alternatively, the quiet-all input can be a single input to reduce the volume of sound from two or more audio sources. For instance, a user can select the quiet-all input 310 via the user interface 300. The quiet-all input 310 can be a switch, a voice command, a touch screen input, etc. In some arrangements, the controller 200 can, in response to the quiet-all input 310, stop sound coming from the two or more audio sources. Alternatively, the controller 200 can reduce the volume of sound coming from the two or more audio sources to a predetermined threshold. The two or more audio sources can be any combination of audio sources. As a non-limiting example, the quiet-all input(s) 310 can stop sound from the entertainment systems 110 and the navigation systems 140.

In one or more arrangements, the quiet-all input(s) 310 can cause the controller(s) 200 to stop all sound coming from all audio sources 100. For instance, the single quiet-all input 310 can stop all sound coming from all audio sources 100.

In one or more arrangements, the quiet-all input(s) 310 can cause the controller(s) 200 to change an output from one or more audio sources 100. For instance, the quiet-all input 310 can cause information to be conveyed to a user via the display(s) 420 and/or the haptic actuator(s) 430. In one or more arrangements, it may not be desirable to stop all alerts from the audio sources 100. The quiet-all input(s) 310 can stop sound from one or more audio sources, while causing display alerts or haptic alerts instead. For example, a display alert can be provided on the display(s) 240 or a haptic alert can be provided by the haptic actuator(s) 430 instead of sounds coming from the speaker(s) 410.

Referring now to FIG. 2, an example view of an interior 12 of a vehicle having the system 10 can be shown. In one or more arrangements, the vehicle can include a display 420. The display 420 can, for example, be located in a center dash portion of the vehicle. In one or more arrangements, the display 420 can be a touch screen display, and can act as both the display 420 and as the user interface 300. In one non-limiting example, the display 420 can include a navigation display 422, a radio display 424, and a safety display 426. In such an example, the audio sources 100 can include the radio 112 of the entertainment system(s) 110, the LKA system 124 of the safety system(s) 120, and the navigation system 140. Two or more of these systems can output audio signals to cause sound to be emitted via one or more speakers.

In one or more arrangements, the quiet-all input 310 can be a button or touch screen input located near the display 420. The quiet-all input 310 can include a marking (e.g., "SHH!", "Quiet-All") to identify the input to a user. Upon selecting the quiet-all input 310, sound can be stopped from two or more of the audio sources 100. In the example of FIG. 2, sounds from two or more of the entertainment system(s) 110, the safety system(s) 120, and the navigation system 140 can be stopped. In some arrangements, instead of sound alerts, the quiet-all input 310 can cause the system 10 to provide display alerts and/or haptic alerts. For instance, the navigation display 422 and/or the safety display 426 can be provided instead of emitting sound through the speakers.

Now that the various potential systems, devices, elements and/or components of the system 10 have been described, various methods of controlling audio within a vehicle will be described. The method 500 illustrated in FIG. 3 may be applicable to the embodiments described above in relation to FIGS. 1 and 2, but it is understood that the method 500 can be carried out with other suitable systems and arrangements. Moreover, the methods may include other steps that are not shown here, and in fact, the methods are not limited to including every step shown in FIG. 3. The steps that are illustrated here as part of the method 500 are not limited to this particular chronological order. Indeed, some of the steps may be performed in a different order than what is shown and/or at least some of the steps shown can occur simultaneously.

Referring now to FIG. 3, an example of a method 500 of controlling audio within a vehicle is shown. At block 510, sound is outputted via one or more speakers in response to audio signals from two or more audio sources. In one or more arrangements, the one or more speakers can include the speaker(s) 410. The two or more audio sources can include any combination of the entertainment system(s) 110, the safety system(s) 120, the communication system(s) 130, and/or the navigation system(s) 140. The method 500 can continue to block 520.

At block 520, a quiet-all input from a user interface can be received. The quiet-all input can be a single input to quiet all sound from the two or more audio sources. In one or more arrangements, the quiet-all input can be the quiet-all input(s) 310 of the user interface 300. For example, the quiet-all input(s) 310 can include a button, switch, voice command, gesture control, and/or touch screen input. In one or more arrangements, the controller(s) 200 can receive a signal based on the quiet-all input. The method 500 can continue to block 530.

At block 530, responsive to receiving the quiet-all input, all sound output via the one or more speakers can be quieted. In one or more arrangements, the controller(s) 200 can cause the sound to be stopped. For example, the controller(s) 200 can stop audio signals from being received by the speaker(s) 410. Alternatively, the controller(s) 200 can cause the sound to be reduced to a predetermined volume threshold. Sound output can be quieted across multiple sound zones within the vehicle.

In one or more arrangements, stopping the sound output via the one or more speakers can include presenting alternative alerts. For example, the alternative alerts can be via the display(s) 420 and/or the haptic actuator(s) 430. The method 500 can end. Alternatively, the method 500 can return to block 510. As a further alternative, the method 500 can include additional and/or alternative blocks (not shown).

It will be appreciated that arrangements described herein can provide numerous benefits, including one or more of the benefits mentioned herein. For example, arrangements described herein can improve occupant comfort within the vehicle. Arrangements described herein can provide a single input for a user to silence, or reduce the volume of, two or more audio sources. Instead of going through individual systems to stop sounds, a single quiet-all input is provided. Arrangements described herein can quickly allow a user of a vehicle to quiet sounds within the vehicle when less sound is desired (e.g., occupants sleeping, ordering at a drive-through, communicating via a phone, interactions between two or more occupants, or a sick occupant). Further, the quiet-all input can be easily accessed within the vehicle. For example, the quiet-all input can be a single button, switch, voice command, gesture control, and/or touch screen input. Such arrangements can be easier, less distracting, and quicker than quieting multiple audio sources individually.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method for controlling audio within a vehicle, the method comprising:
   outputting sound via one or more speakers in response to audio signals from two or more audio sources;
   receiving a quiet-all input via a user interface, the quiet-all input comprising one or more instructions to reduce all sound from the two or more audio sources; and
   responsive to receiving the quiet-all input, selectively reducing, via a controller, all sound output via the one or more speakers from at least one of the two or more audio sources, wherein selectively reducing all sound output includes causing output from one or more audio sources to be changed so as to be conveyed to a user in a different form, the different form being haptically.

2. The method of claim 1, wherein selectively reducing all sound output via the one or more speakers includes stopping all sound output or reducing a volume of all sound output to a predetermined threshold.

3. The method of claim 1, wherein the two or more audio sources comprises two or more of the group consisting of: an entertainment system, a safety system, a communication system, and a navigation system.

4. The method of claim 3, wherein the entertainment system includes one or more of a radio, a video player, and an external media player.

5. The method of claim 3, wherein the safety system includes one or more of an adaptive cruise control (ACC) system, a lane keeping assist (LKA) system, and a restraint indicator system.

6. The method of claim 1, further comprising:
   outputting a display alert or a haptic alert for one or more of the two or more audio sources in response to receiving the quiet-all input.

7. The method of claim 1, wherein selectively reducing all sound output via the one or more speakers from at least one of the two or more audio sources includes quieting all sound output via the one or more speakers.

8. The method of claim 1, wherein the one or more speakers are arranged to create two or more sound zones in the vehicle, and the selectively reducing all sound output through the one or more speakers from at least one of the two or more audio sources includes quieting all sound output in the two or more sound zones.

9. The method of claim 1, wherein the one or more instructions of the quiet-all input includes a user configured threshold and one or more user configured zones.

10. An audio control system for a vehicle, the system comprising:
    two or more audio sources;
    one or more speakers located within the vehicle;
    a user interface having a quiet-all input, the quiet-all input being a single input to quiet all sound from the two or more audio sources; and
    a processor communicatively linked to the two or more audio sources, the one or more speakers, and the user interface, the processor being programmed to initiate executable operations comprising:
      outputting sound via the one or more speakers in response to audio signals from the two or more audio sources;
      receiving a quiet-all input via a user interface, the quiet-all input comprising one or more instructions to reduce all sound from the two or more audio sources; and
      responsive to receiving the quiet-all input via the user interface, selectively reducing all sound output via the one or more speakers from at least one of the two or more audio sources, wherein selectively reducing all sound output includes causing output from one or more audio sources to be changed so as to be conveyed to a user in a different form, the different form being haptically.

11. The system of claim 10, wherein the two or more audio sources comprises two or more of the group consisting of: an entertainment system, a safety system, a communication system, and a navigation system.

12. The system of claim 11, wherein the entertainment system comprises a radio, a video player, or an external media player.

13. The system of claim 11, wherein the safety system comprises an adaptive cruise control (ACC) system, a lane keeping assist (LKA) system, or a restraint indicator system.

14. The system of claim 11, wherein the communication system comprises a phone and an internet device.

15. The system of claim 10, further comprising:
    outputting a display alert or a haptic alert for one or more of the two or more audio sources responsive to receiving the quiet-all input.

16. The system of claim 15, wherein the display alert is outputted for a navigation system and the haptic alert is outputted for a safety system.

17. The system of claim 10, wherein the one or more speakers are arranged to create two or more sound zones in the vehicle, and the stopping all sound output through the one or more speakers from the two or more audio sources includes stopping all sound output in the two or more sound zones.

18. The system of claim 10, wherein stopping all sound output via the one or more speakers from at least one of the two or more audio sources includes stopping all sound output via the one or more speakers.

19. The system of claim 10, wherein the one or more instructions of the quiet-all input includes a user configured threshold and one or more user configured zones.

\* \* \* \* \*